United States Patent [19]
Madsen

[11] Patent Number: 5,449,975
[45] Date of Patent: Sep. 12, 1995

[54] METHOD AND ARRANGEMENT FOR REDUCING ELECTRICAL ALTERNATING FIELDS GENERATED IN THE SURROUNDINGS OF A DISPLAY UNIT

[75] Inventor: Knud Madsen, Järfälla, Sweden

[73] Assignee: ICL Sytems AB, Kista, Sweden

[21] Appl. No.: 189,041

[22] Filed: Jan. 31, 1994

[30] Foreign Application Priority Data

Feb. 2, 1993 [SE] Sweden .................... 9300321

[51] Int. Cl.⁶ .................................... H01J 1/52
[52] U.S. Cl. ............................. 315/85; 315/8; 361/146
[58] Field of Search ............... 315/85, 1, 8; 361/146

[56] References Cited

U.S. PATENT DOCUMENTS

| | | | |
|---|---|---|---|
| 5,162,706 | 11/1992 | Hsu | 315/411 |
| 5,218,270 | 6/1993 | Haapakoski | 315/85 |
| 5,231,332 | 7/1993 | Beaumont | 315/85 |

FOREIGN PATENT DOCUMENTS

| | | |
|---|---|---|
| 0009409 | 4/1980 | European Pat. Off. . |
| 0498589 | 8/1992 | European Pat. Off. . |
| 3603476 | 8/1987 | Germany . |
| 4123565 | 9/1992 | Germany . |
| WO93/10537 | 5/1993 | WIPO . |

Primary Examiner—Robert J. Pascal
Assistant Examiner—Reginald A. Ratliff
Attorney, Agent, or Firm—Lee, Mann, Smith, McWilliams, Sweeney & Ohlson

[57] ABSTRACT

The invention relates to a method and arrangement for reducing to a minimum the electrical alternating fields generated in the surroundings of a visual display unit (1). The visual display unit includes a voltage connected part (5), on which undesirable voltage variations occur. A smoothing high voltage capacitor (C3) of high capacitance is connected to the voltage connected part (5). Connected between the high voltage capacitor (C3) and earth is a compensating circuit (20) which functions as a negative capacitor whose capacitance is greater than the capacitance of the high voltage capacitor (C3) by a given factor.

10 Claims, 2 Drawing Sheets

METHOD AND ARRANGEMENT FOR REDUCING ELECTRICAL ALTERNATING FIELDS GENERATED IN THE SURROUNDINGS OF A DISPLAY UNIT

This invention relates to visual display units and in particular to methods and arrangements for reducing the electrical alternating fields generated in the surroundings of the visual display units.

BACKGROUND OF THE INVENTION

The hazards of working in front of video display units were discussed in the 1980s. As a result of these discussions, it is now a standard requirement that emissions of various kinds, such as magnetic fields, electrical fields, etc, shall be kept to the lowest possible level. The discussions have resulted in methods for voluntarily testing video screens. As from 1987, there has been a strong commercial demand to fulfil certain recommended measurement values in conjunction with the recommended measuring method. In certain instances, it is necessary to fulfil still more stringent, customer-specific requirements. The ability to show comparatively low measurement values in these voluntary tests has given a competitive edge to retailers. The revised methods for voluntarily testing video display units have included testing for electrical alternating fields. These fields are often measured in two frequency bands, band I (5 Hz–2 kHz) and band II (2 kHz–400 kHz).

The electrical alternating fields deriving from a visual display unit, primarily a CRT type unit (cathode ray tube unit) are generated by a number of different electrical components included in the unit. It is a relatively easy matter to screen the electrical alternating fields in all directions with the exception of the forward direction immediately in front of the screen, for instance with the aid of screening plates, electrically conductive outer casings or housings, or with the aid of electrically conductive layers or coatings on a plastics outer casing. The electrical alternating field that extends forwardly from the screen surface of a CRT type video display unit is caused by variations in the acceleration voltage applied inwardly of the front glass of the video display unit.

One method of dealing with the effect of the electrical alternating fields that are generated in front of a display screen among other things, involves the use of a transformer in the high voltage part with low internal impedance, although this solution is expensive if the result is to be effective. Another method involves coupling an external capacitor across the acceleration voltage. This solution results in smoothing of the acceleration voltage.

Other methods involve the provision of an electrically conductive panel or like device in front of the picture tube. This solution requires a panel of a very high conductivity in order to be able to reduce the alternating fields in both band I and band II. Consequently, such panels are expensive and/or result in impaired synergonomical properties. For instance, the picture becomes out of focus, ie is blurred, and the light yield is inferior to the light yield of a standard screen, ie the panel does not have full light transmission.

An object of the present invention is to achieve with a video display unit, and primarily a CRT type unit, the smallest possible electrical alternating fields in the surroundings of the picture tube, and particularly in front of the screen of the unit.

To this end, there is described in the International Patent Application No PCT/SE92/00794 (WO-A1-9310537) which is assigned to the same Assignee as the present Application, an arrangement for reducing to a minimum the electrical alternating fields that are generated in the surroundings of a visual display unit. The display unit is provided with a voltage-connected or live part, eg an electrically conductive coating, on which undesirable signal variations occur. The undesirable voltage variations are indicated, a signal which is phase-reversed in relation to the indicated voltage variations is generated, and the signal is applied to the voltage-connected or live part. In the case of this known arrangement, the undesirable voltage variations are mainly detected indirectly, such as from the deflecting coil pack and across a winding on the high voltage transformer. This method has been adopted because the main object was to compensate for undesirable voltage variations within band II and because the main source of these variations is derived essentially as the result of the capacitance that is formed between the aluminium layer of the anode on the inside of the picture tube and the deflecting coil pack around the neck of said tube.

Another object of the present invention is to compensate for relatively low-frequency voltage ripple on the anode or the electrically conductive layer adjacent thereto of a CRT type visual display unit, particularly within band I.

A further object of the invention is to provide for different degrees of compensation for voltage ripple within band I and band II.

SUMMARY OF THE INVENTION

According to one aspect of the present invention there is provided a method for reducing to a minimum electrical alternating fields generated in the surroundings of a video display unit which includes a voltage-connected part on which undesirable voltage variations occur, wherein one end of a smoothing high voltage capacitor of high capacitance is connected to the voltage-connected part, and including the steps of (a) disconnecting the other end of the high voltage capacitor from earth;

(b) detecting the current through the high voltage capacitor in the other end of the high voltage capacitor; and (c) generating a compensation voltage in dependence on the detected current, said compensation voltage being phase-shifted towards the detected current so as to lie in counterphase to the undesired voltage variations and being supplied to the other end of the high voltage capacitor.

According to another aspect of the present invention there is provided an arrangement for reducing to a minimum electrical alternating fields generated in the surroundings of a visual display unit, said visual display unit including a voltage connected part on which undesirable voltage variations occur, and said arrangement including a smoothing high voltage capacitor of high capacitance connected to the voltage connected part, and wherein there is connected between the high voltage capacitor and earth a compensation circuit which functions as a negative capacitor with a capacitance which is greater than the capacitance of the high voltage capacitor by a predetermined factor.

The invention is particularly suited for solving the problems of undesirable voltage variations obtained with CRT type colour screens.

BRIEF DESCRIPTION OF THE DRAWINGS

Embodiments of the invention will now be described in more detail with reference to the accompanying drawings, in which.

DESCRIPTION OF THE PREFERRED EMBODIMENTS

Figure 1:
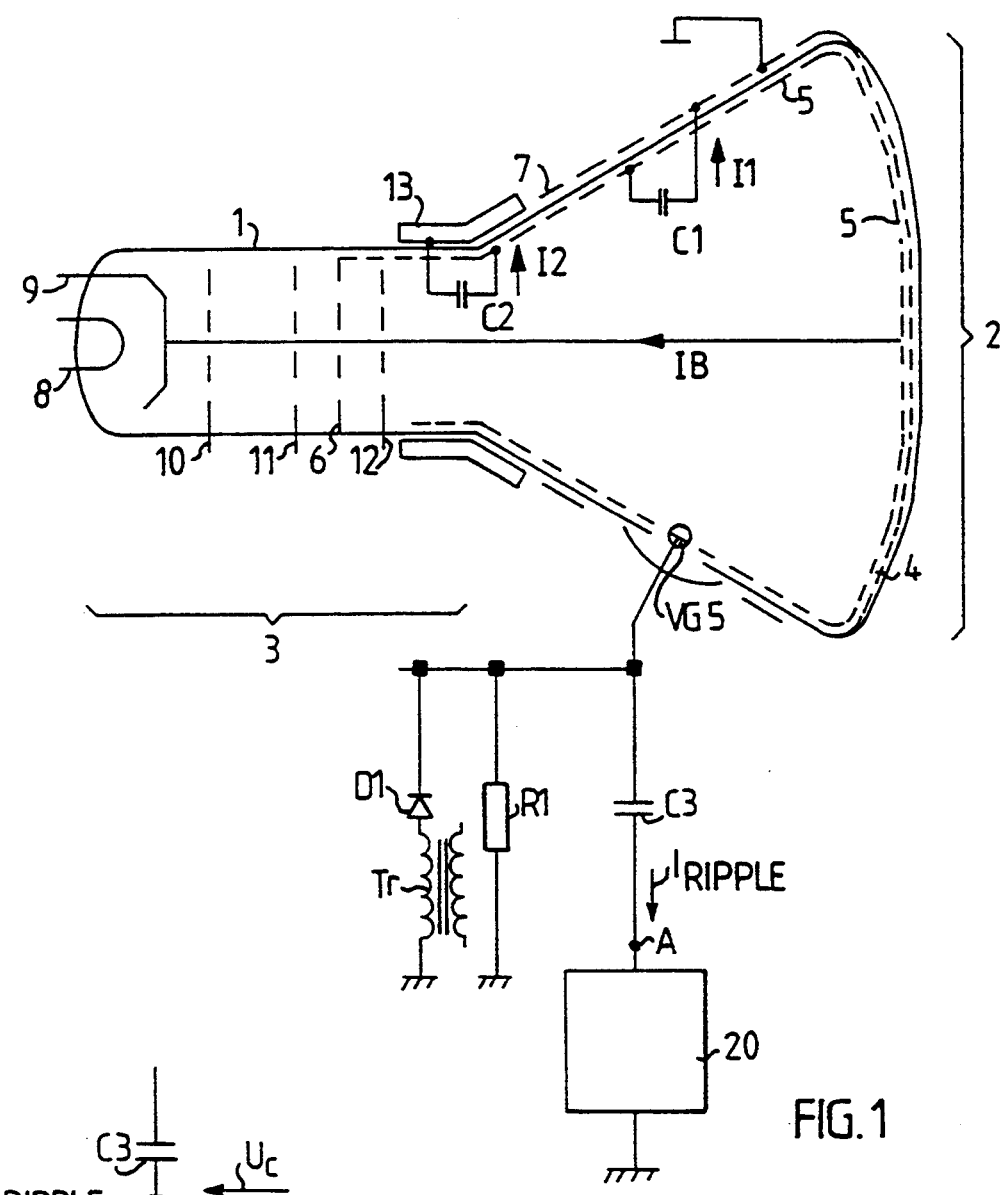
FIG. 1 is a sectional view of a CRT type picture tube and illustrates schematically a coupling circuit according to one embodiment of the inventive arrangement.

The picture tube illustrated in FIG. 1 comprises a glass outer casing 1. The glass casing has a picture tube face 2 which is generally flat and rectangular in the direction facing forwards towards a viewer. The tube narrows rearwardly and terminates in a tubular part 3, referred to as the tube neck.

The inner surface of the front face 2 of the tube is coated with a layer 4 of fluorescent salts. A thin aluminium layer 5, which is both reflective and electrically conductive, is applied to the inner surface of the outer casing 1, inwardly of the fluorescent layer 4 at the front of the tube and directly against the casing surface on the narrowing part of the casing between the tube neck 3 and the tube front 2 and also over a short distance on the inner surface of the tube neck 3, and is connected electrically to the acceleration electrode 6 of the picture tube and functions as an anode. An electrically conductive carbon layer 7 is applied to the outer surface of the outer casing 1, between the tube neck 3 and the tube front 2.

The neck 3 of the picture tube includes an electron gun comprising, a heating element 8, a cathode 9 which is heated by the heating element 8, an acceleration electrode 6, and control grids 10, 11, 12. Electrons can be permitted to pass through the grids in the electron gun and are accelerated by the acceleration voltage applied to the acceleration electrode and the layer 5, to impinge on the fluorescent layer 4 on the front 2 of the picture tube 1. The fluorescent salt layer 4 emits light as the electrodes impinge thereon.

A deflecting coil pack 13 is mounted around the neck of the tube. This coil pack includes two pairs of windings and a magnetic field, which is variable in two mutually opposed perpendicular directions, can be generated with the aid of these windings and by controlling the windings in an appropriate manner. The electrons are deflected as they pass through this magnetic field. The point of impact of the electrons on the front face of the picture tube is controlled with the aid of the deflecting coil pack and therewith also by where light is generated on the front of the tube. The deflecting coil pack 13 is formed after the picture tube and the coil pair that is seated proximal to the picture tube obtains a capacitive coupling C2 to the aluminium layer 5 located within the picture tube 1 on the inside of the casing.

When the picture tube is switched-on, an acceleration voltage is applied between the aluminium layer 5 and the cathode 9. The carbon layer 7 is connected to 0V, ie ground potential. The acceleration voltage between cathode 9 and acceleration electrode 6 is coupled to the acceleration electrode side on one side of the picture tube in a separate contact VG5, which is connected to the aluminium layer 5 and normally attains a voltage of between 12 kV and 30 kV, depending upon application. The layers 5 and 7 thereby form a capacitance C1 which is charged to the acceleration voltage and which forms an energy reservoir.

A high voltage transformer Tr is connected in series with one or more diodes D1 between earth and the anode 5 of the CRT tube. A high ohmic resistor R1 is connected in parallel with the high voltage generator Tr. The subject matter described above belongs to the known prior art.

One connecting terminal of a capacitor C3 is connected to the anode 5. The other terminal of his capacitor is normally connected to earth. The capacitor C3 functions as a smoothing capacitor. However, a capacitor of very high capacitance is required to achieve smoothing to an extent sufficient to damp the ripple on the anode to a minimum. Conventional smoothing capacitors are only able to damp anode ripple to a certain limit.

According to the present invention, a circuit 20 is connected between the capacitor C3 and earth, this circuit functioning as a negative capacitor of capacitance C4. The resultant capacitance is then:

$$C = (C3*(-C4))/(C3+(-C4)) = C3*C4/(C4-C3)$$

Thus, the resultant capacitance can be made extraordinarily large when the negative capacitance C4 generated by the circuit 20 is insignificantly greater than the capacitance of the capacitor C3.

Figure 2:
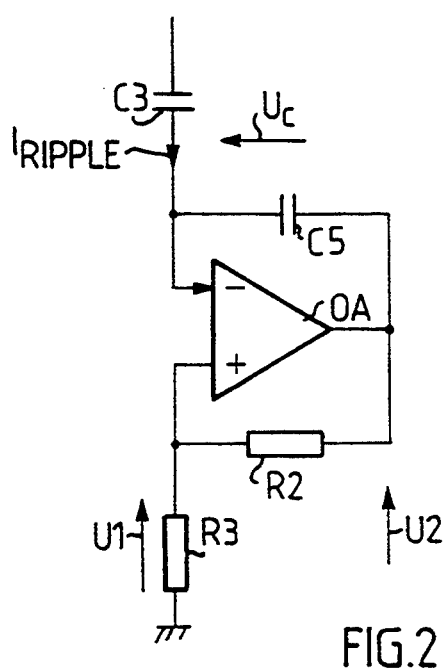
FIG. 2 illustrates an exemplifying embodiment of a coupling circuit according to the first embodiment of the inventive arrangement.

One expedient method of creating this negative capacitance C4 is illustrated schematically in FIG. 2. The inverting input of an operational amplifier OA is connected to the high voltage capacitor C3. The incoming current is $I_{ripple}$ and is referred to hereinafter as Ii(t), implying that the current is a function of time t. The output of the operational amplifier is fed back to its inverting input ((−) input) via a capacitor C5 and to its non-inverting input ((+) input) via a resistor R2 of resistance R. The (+) input is connected to earth through a resistor R3 of resistance k*R, where k is a constant. A voltage U1 is present across the resistor R3, a voltage U2 is present between the output of the amplifier OA and earth, and a voltage Uc is present across the capacitor C5. The following equations apply:

$$U1 = U2*k/(1+k) \quad U1 = Uc + U2 => k*Uc = -U1$$

$$U1 = -k*Uc = -(k/C5)* \int I1(t)dt$$

The circuit impedance Z1 is:

$$Z1 = U1/I1 = -(k/C5)*(1/I1(t))* \int I1(t)dt$$

$$Z1 \approx -C5/k \approx C4$$

Another way of expressing how the circuit 20 illustrated in FIG. 2, operates is as follows. The capacitor C3 is connected to the anode 5 and thus has the ripple voltage $U_{ripple}$, which is compensated for on one terminal of the capacitor. The circuit 20 detects the ripple current II(t) in the high voltage capacitor C3 at point A. A voltage U ($\approx$U1) is generated in point A, such that $-U = \alpha*U_{ripple}$, where $\alpha$ is a constant, $0 \leq \alpha < 1$. This means that the voltage U essentially balances out $U_{ripple}$.

The same circuit will effect compensation with the same factor α for both band I and band II, although because the source of the undesirable voltage variations within band I are due to the internal resistance in the high voltage generator and because the undesirable voltage variations within band II are essentially due to capacitance C2 between the deflecting coil pack 13 and the anode 5, it may be necessary to make further compensation within band II. This is particularly significant in the case of colour picture tubes.

Figure 3:
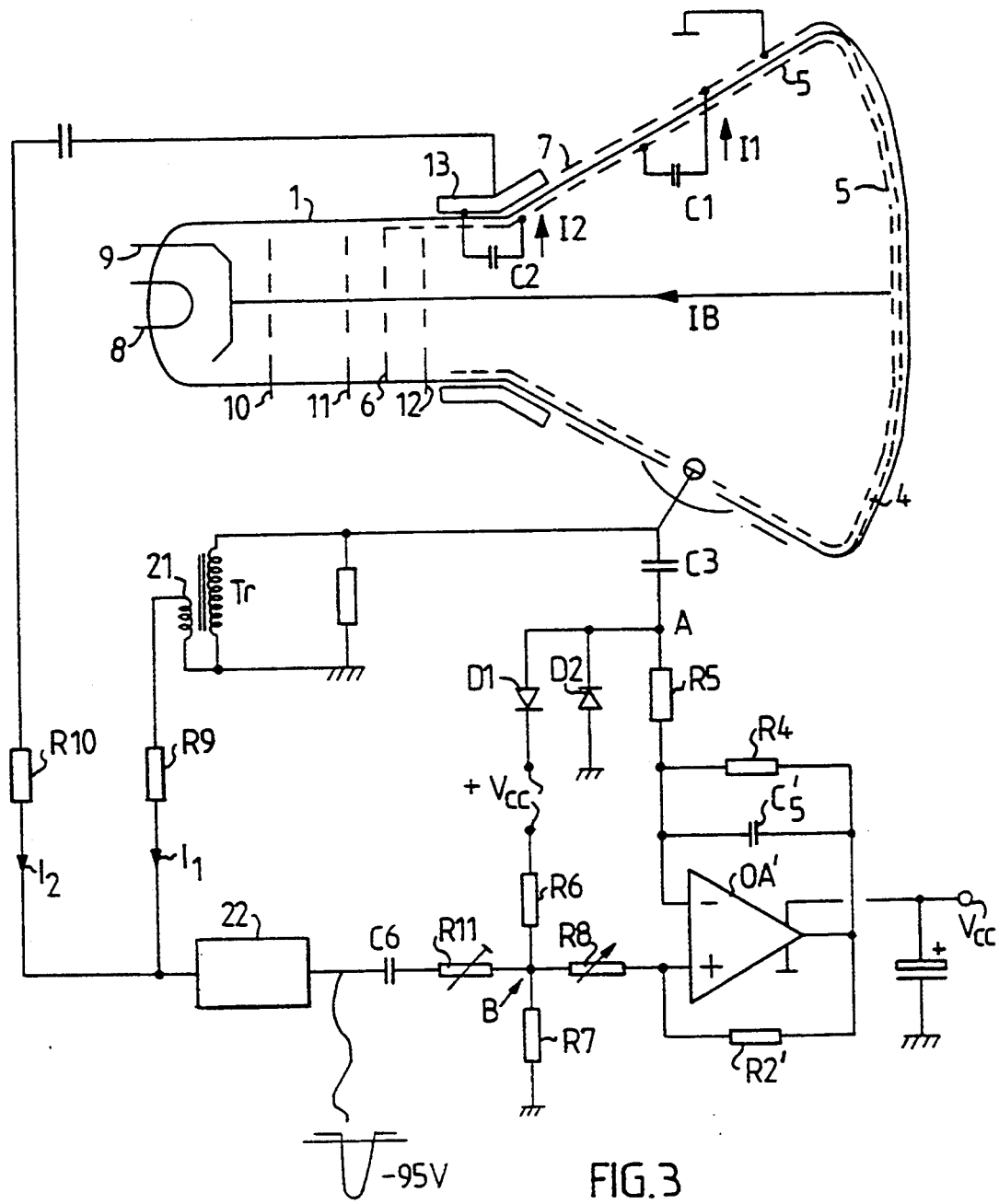
FIG. 3 illustrates a picture tube and a second embodiment of coupling circuit.

FIG. 3 illustrates a compensating circuit which produces different degrees of compensation for band I and band II. The circuit for compensating undesirable voltage variations within band I includes the operation amplifier OA' with a feedback capacitor C5' in parallel with a high ohmic resistor R4. A low ohmic resistor R5 is connected between the high voltage capacitor C3 and the (−) input of the operational amplifier OA'. The point A is connected to the connection point between two series-connected diodes D1, D2, which are connected in their reverse direction between a drive voltage source +Vcc and earth as a circuit protector, in a conventional manner. A resistor R2' is connected between the OA' output and the (+) input of the operational amplifier. A trimmable resistor R8 is connected between the connection point of one of two series-connected resistors R6 and R7 connected between the drive voltage source +Vcc and earth, and the (+) input of the operational amplifier OA'. The aforesaid compensating constant α can be trimmed with the resistor R8.

The additional compensation for band II is obtained in accordance with the principle described in the aforesaid International Patent Application No PCT/SE92/00794.

The voltage variations on the acceleration voltage are not detected directly, but over a secondary winding 21 on the high voltage transformer Tr of significantly lower voltage, which can be easily managed. One end of the secondary winding 21 is connected to earth. The other end of the secondary winding 21 is connected, via a resistor R9, to and measures a current $i_1$ to the input of a phase-shifting stage 22.

The deflecting coil pack 13 is also supplied from the high voltage transformer (not shown). A current $i_2$ is therefore also supplied from the deflecting coil pack 13, via a resistor R10, to the input of the phase-shifting stage 22 and added to current $i_1$ in an appropriate proportion.

The output signal from the phase-shifting stage 22 is applied to the connecting point B of the voltage divider R6, R7, via a capacitor C6 and a trimmable resistor R11. The additional degree of compensation for band II is trimmed in on the resistor R11. The phase shift on the phase-shifting stage 22 is adapted to the phase shift that occurs in the circuit OA', C5', R4 and R5, so that the signal arriving at point B from the phase-shifting stage will occur at point A as an adapted part in counterphase to the input signal to the phase-shifting stage 22 superimposed on $-\alpha * U_{ripple}$.

I claim:

1. A method for reducing to a minimum electrical alternating fields generated in the surroundings of a video display unit which includes a voltage-connected part on which undesirable voltage variations occur, wherein one end of a smoothing high voltage capacitor of high capacitance is connected to the voltage-connected part, and including the steps of (a) disconnecting the other end of the high voltage capacitor from earth;
    (b) detecting the current through the high voltage capacitor in the other end of the high voltage capacitor; and
    (c) generating a compensation voltage in dependence on the detected current, said compensation voltage being phase-shifted towards the detected current so as to lie in counterphase to the undesired voltage variations and being supplied to the other end of the high voltage capacitor.

2. A method according to claim 1, and including the step of adapting the size of the generated compensation voltage by a given factor (α) times the size of the undesirable voltage variations, said factor (α) lying between the values zero and one.

3. A method according to claim 1 and including the step of also detecting a signal which is dependent on undesirable voltages that are primarily caused by variations in the acceleration voltage of the video display unit, phase-inverting the detected signal and superimposing an adapted part thereof on the compensation voltage obtained by detecting the current through the high voltage capacitor, in order to obtain different degrees of compensation for a low frequency band having a frequency range between the frequencies 5 Hz and 2 kHz and a high frequency band having a frequency range between the frequencies 2 kHz and 400 kHz.

4. A method according to claim 2 and including the step of also detecting a signal which is dependent on undesirable voltages that are primarily caused by variations in the acceleration voltage of the video display unit, phase-inverting the detected signal and superimposing an adapted part thereof on the compensation voltage obtained by detecting the current through the high voltage capacitor, in order to obtain different degrees of compensation for a low frequency band having a frequency range between the frequencies 5 Hz and 2 kHz and a high frequency band having a frequency range between the frequencies 2 kHz and 400 kHz.

5. An arrangement for reducing to a minimum electrical alternating fields generated in the surroundings of a visual display unit, said visual display unit including a voltage connected part on which undesirable voltage variations occur, and said arrangement including a smoothing high voltage capacitor of high capacitance connected to the voltage connected part, wherein there is connected between the high voltage capacitor and earth a compensation circuit which functions as a negative capacitor with a capacitance which is greater than the capacitance of the high voltage capacitor by a predetermined factor, wherein the compensation circuit includes an operational amplifier with an inverting input of the amplifier connected to the high voltage capacitor, and wherein the output of the operational amplifier is feedback connected to its inverting input via a capacitor and to its non-inverting input via a resistor of resistance R, and the non-inverting input of which amplifier is connected to earth via a resistive device of resistance k*R, where R and k are constants.

6. An arrangement for reducing to a minimum electrical alternating fields generated in the surroundings of a visual display unit, said visual display unit including a voltage connected part on which undesirable voltage variations occur, and said arrangement including a smoothing high voltage capacitor of high capacitance connected to the voltage connected part, wherein there is connected between the high voltage capacitor and earth a compensation circuit which functions as a negative capacitor with a capacitance which is greater than the capacitance of the high voltage capacitor by a predetermined factor, and wherein the voltage variations on the voltage connected part are indicated within a frequency band and phase-shifted in a phase-shifting circuit; and wherein an adapted part of the output signal of the phase-shifting circuit is applied to an input of the compensation circuit; and wherein the phase-shifting circuit has a phase-shift such that an adapted part of the input signal of the phase-shifting circuit in use of the arrangement appears as a superimposed phase-inverted signal on the connecting point of the compensation circuit connected to the high voltage capacitor.

7. An arrangement as claimed in claim 5 and wherein the voltage variations on the voltage connected part are indicated within a frequency band and phase-shifted in a phase-shifting circuit; and wherein an adapted part of the output signal of the phase-shifting circuit is applied to an input of the compensation circuit; and wherein the phase-shifting circuit has a phase-shift such that an adapted part of the input signal of the phase-shifting circuit in use of the arrangement appears as a superimposed phase-inverted signal on the connecting point of the compensation circuit connected to the high voltage capacitor.

8. An arrangement according to claim 5, wherein the resistive device is variable, whereby the constant $k$ is variable.

9. An arrangement according to claim 7, wherein a resistive device of variable resistance is connected between the phase-shifting circuit and the non-inverting input of the operational amplifier.

10. A method for reducing to a minimum electrical alternating fields generated in the surroundings of a video display unit which includes a voltage-connected part on which undesirable voltage variations occur, wherein one end of a smoothing high voltage capacitor of high capacitance is connected to the voltage-connected part, and including the steps of (a) disconnecting the other end of the high voltage capacitor from earth;

(b) detecting the current through the high voltage capacitor at the other end of the high voltage capacitor by means of a detecting and compensation circuit; and (c) producing a very large resultant capacitance by connecting the high voltage capacitor and the detecting and compensation circuit in series and thereby generating a compensation voltage in dependence on the detected current, said compensation voltage being supplied to the other end of the high voltage capacitor and being phase-shifted towards the detected current so as to lie in counter phase to the undesired voltage variations, whereby to bring them to a minimum.

* * * * *